United States Patent
Dvolaitzky et al.

[11] 3,723,420
[45] Mar. 27, 1973

[54] DERIVATIVES OF DIBENZO(A,D)5H-CYCLOHEPTENE, METHOD OF PREPARATION, AND APPLICATION THEREOF

[75] Inventors: Frajda Dvolaitzky, Paris; Jean-Claude Cognacq, Bourg-la-Reine; Esther Ber, Paris, all of France

[73] Assignee: Societe Civile Auguil, Paris, France

[22] Filed: May 20, 1970

[21] Appl. No.: 39,148

[30] Foreign Application Priority Data

May 20, 1969 France..................................6916251

[52] U.S. Cl. ............260/240 TC, 424/244, 424/248, 424/250, 424/267, 424/274, 424/330, 260/239 B, 260/247.5 R, 260/268 TR, 260/293.62, 260/326.81, 260/570.5 CA, 260/570.8 TC, 260/618 R, 260/668 F

[51] Int. Cl. ..............................................C09b 29/12

[58] Field of Search........260/240 TC, 571, 570.8 TC

[56] References Cited

UNITED STATES PATENTS

| 3,073,847 | 1/1963 | Doebel et al. | 260/240 TC X |
|---|---|---|---|
| 3,126,411 | 4/1962 | Rey-Bellet et al. | 260/240 TC X |
| 3,136,765 | 6/1964 | Dimroth et al. | 260/247.7 |

FOREIGN PATENTS OR APPLICATIONS 628,904  2/1963  Belgium ......................260/570.8 TC

*Primary Examiner*—John D. Randolph
*Attorney*—Andrew Kafko, Dwight J. Potter and Joseph Martin Weigman

[57] ABSTRACT

New chemical compound of the formula

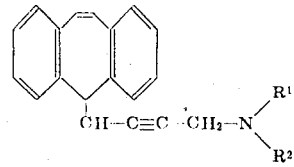

wherein $R^1$ and $R^2$ are each selected from the group consisting of alkyl or hydroxyalkyl, or where

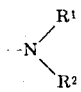

forms part of a heterocycle; and acid addition salts thereof. These compounds are active on the central nervous system and on the cardiovascular system.

29 Claims, No Drawings

DERIVATIVES OF DIBENZO(A,D)5H-CYCLOHEPTENE, METHOD OF PREPARATION, AND APPLICATION THEREOF

This invention is directed to new chemical compounds which are derivatives of dibenzo[a,d]-5H-cycloheptene; to their preparation from readily available starting materials; and to their utilization, particularly as therapeutic agents.

The new chemical compounds may be represented by the formula

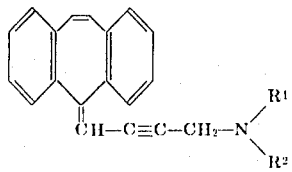

I wherein $R^1$ and $R^2$ are each selected from the group which consists of alkyl or hydroxyalkyl or wherein

forms part of a heterocycle.

The alkyl radicals as well as the alkyl moieties of the hydroxyalkyl radicals, represented by $R^1$ and/or $R^2$, are preferably lower alkyl radicals.

When $R^1$ and/or $R^2$ represent hydroxyalkyl radicals this may advantageously be an ω-hydroxyalkyl radical, notably β-hydroxyethyl.

The heterocyclic radical of which

may constitute a portion is preferably a heterocycle of from four to seven members. Thus, this heterocycle may be pyrrolidine, piperidine, morpholine, perhydroazepine or a N-alkyl piperazine, of which the alkyl is preferably lower alkyl.

Since these new chemical compounds of the formula given above can form acid addition salts with acids, these acid addition salts also possessing therapeutic properties, these acid addition salts are equally included as part of our invention.

In preparing these new chemical compounds we prefer to effect condensation between a propargyl metal halide of the formula $$(HC \equiv C - CH_2X)_n/2\ M$$

where X is a halogen; M is a metal; and n is equal to the valence of M, and the compound 5-oxo-dibenzo[a,d]cycloheptene. The resulting compound is subject to a Mannich reaction utilizing a source of formaldehyde and an amine of formula

$R^1$ and $R^2$ having the significance above indicated.

The starting material 5-oxo-dibenzo[a,d]cycloheptene may be prepared in accordance with procedures described in Cesk. Farm., Volume 11, pages 3 to 7 (1962), or in accordance with procedures described in Journ. Med. Chem., Volume 8, (6) page 886 (1965).

Starting with this compound 5-oxo-dibenzo[a,d]cycloheptene, our novel chemical compounds may be prepared in accordance with two variant processes which may be illustrated as follows:

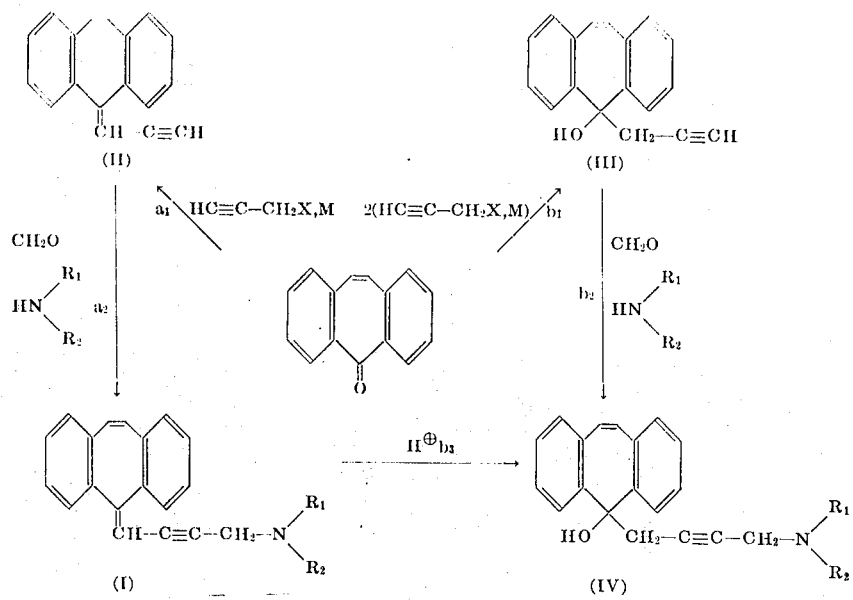

The central compound on this flow sheet is the starting material 5-oxo-dibenzo[a,d]cycloheptene of formula

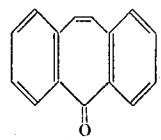

The new products are marked by the Roman numeral I. In this flow sheet the reagents utilized in the steps of the process are indicated alongside the arrows.

Referring more particularly to the first illustrated process for preparing our new dibenzo[a,d]-5H-cycloheptene derivatives, in the first step thereof, marked $a_1$, 5-oxo-dibenzo[a,d]cycloheptene is condensed with approximately one equivalent of a propargyl metal halide, thus obtaining compound II, the compound 5-(2-propyne-1-ylidene)dibenzo[a,d]-5H-cycloheptene. This is a new chemical compound. We may advantageously carry out this first step of the process, the $a_1$ stage, by utilizing propargyl aluminum bromide as reagent.

In the second stage of the process, marked $a_2$ on the flow sheet, a Mannich reaction is carried out on 5-(2-propyne-1-ylidene)dibenzo[a,d]-5H-cycloheptene.

In order to effect this reaction, compound II is treated, preferably at the boiling point, in a mixture of ethanol and a solvent which increases the reaction velocity, such as a cyclic ether oxide, for example dioxane or tetrahydrofuran, with a suitable amine and a source of formaldehyde. The reaction is preferably carried out in the presence of catalytic amounts of a copper compound. For this purpose there may be used salts and oxides of copper, for example cupric acetate, basic cupric acetate, cupric bromide, cupric chloride, cupric ammonium chloride, cupric formate, cupric nitrate, cupric oxide, cupric sulfate, cupric p-toluene sulfonate, cuprous acetate, cuprous bromide, cuprous chloride, cuprous cyanide, cuprous iodide, cuprous oxide, cuprous thiocyanate, and other copper compounds.

In the second disclosed process for preparing our new dibenzo[a,d]-5H-cycloheptene derivatives, which is illustrated at the righthand side of the flow sheet, 5-oxodibenzo[a,d]cycloheptene is condensed with about two equivalents of a propargyl metal halide to secure compound III, the new chemical compound 5-(2-propyne)-5-hydroxy-dibenzo [a,d]-5H-cycloheptene. This step is indicated as $b_1$ on the flow sheet. We prefer to use in this stage propargyl magnesium bromide or propargyl aluminum bromide.

A Mannich reaction, denominated $b_2$ on the flow sheet, is then carried out on compound III under conditions similar to those of the corresponding stage $a_2$ in the first variation of our process. There is thereby secured the new 5-hydroxy compound, IV, which, by dehydration (step $b_3$), yields the desired pharmacologically active compounds I. This dehydration can be carried out in a strongly acid medium, preferably in the presence of sulfuric acid. The use of hydrochloric acid results, in certain cases, in an addition reaction on the triple bond, notably when

is derived from piperidine, perhydroazepine, morpholine, an N-alkylpiperazine or when $R^1$ or $R^2$ are ethyl radicals.

Our new chemical compounds of formula I have pharmacological properties which make them valuable in therapy. In particular, they are active on the central nervous system and in the cariovascular system. Their acid addition salts, especially those with pharmacologically acceptable acids, possess the same therapeutic properties as the bases, and are useful as therapeutic agents. Among such salts may be mentioned the oxalates, maleates and hydrochlorides.

Our invention is also directed to applications or uses of the new compounds of formula I, as well as to pharmaceutical compositions comprising a compound of formula I, or one of its non-toxic acid addition salts, dispersed or distributed in a therapeutically administrable vehicle or excipient.

Our invention may be illustrated by the following examples.

EXAMPLE I 5-(2-Propyne-1-ylidene)dibenzo[a,d]-5H-Cycloheptene (Compound II)

To 100 milliliters of a 1N solution of propargyl aluminum bromide in anhydrous ether there is added, drop by drop, a solution of 0.1 mol of 5-oxodibenzo[a,d]cycloheptene in 80 milliliters of anhydrous tetrahydrofuran while maintaining gentle boiling. Agitation is continued for 5 hours at room temperature. There is then added a mixture of water, ice and aluminum chloride and the reaction mixture is then extracted with ether, dried over sodium sulfate, and the solvent removed by evaporation under vacuum.

The resulting product is then dissolved in a minimum amount of chloroform and subjected to chromatography on basic alumina and then eluted with ether. The ether is removed from the resulting ethereal solution, followed by redissolving the product in a warm mixture containing equal parts of ethanol and isopropanol. The solution is subjected to treatment with animal charcoal and filtered. The product, the title compound, crystallizes slowly. It is removed by centrifugal action and dried. Its melting point is 90°C. (Kofler).

EXAMPLE II 5-(2-Propyne)-5-hydroxy-dibenzo[a,d]-5H-Cycloheptene (Compound III)

To 200 milliliters of a 1N solution of propargyl aluminum bromide in anhydrous ether, there is added, drop by drop, a solution of 0.1 mol of 5-oxodibenzo[a,d]cycloheptene in 80 milliliters of anhydrous tetrahydrofuran while maintaining gentle boiling. At the conclusion of the heating, the solution is allowed to stand, with agitation, at room temperature for 30 minutes. It is then cooled and treated with a mixture of water, ice and ammonium chloride. This is followed by extraction with ether, drying over sodium sulfate and removal of the solvent under a reduced pressure, less than atmospheric, i.e. under vacuum. The above-named product crystallizes from cyclohexane. The crystals have a melting point of 117°C.

EXAMPLE III 5-(4-Dimethylamino-2-butyne)-5-hydroxy-dibenzo[a,d]-5H-cycloheptene (Compound IV)

In this type formula for compound IV, of which this is an example, $R^1$ and $R^2$ are both methyl.

To 0.12 mol of dimethylamine in 40 percent aqueous solution, sufficient acetic acid is added to adjust the pH to 5. There is then added 15 milliliters of formol (formaldehyde source) in 30 percent aqueous solution;
0.1 mol of propargyl alcohol (compound III);
250 milligrams of cuprous chloride;
150 milliliters of propionic acid;
50 milliliters of dioxane.

The mixture is refluxed for 3 hours. It is then diluted by addition of 5 volumes of water. Sufficient ammonia is added to render the solution alkaline in reaction. This is followed by extraction with ether, drying over sodium sulfate, and removal of the solvent at a reduced pressure less than atmospheric, i.e. under vacuum. The title compound is obtained upon crystallization from cyclohexane. Melting point, 138°C.

EXAMPLE IV 5-(4-Dimethylamino-2-butyne-1-ylidene) dibenzo[a,d]-5H-Cycloheptene (Compound I)

This compound is identified herein as AU–2176, and it is represented by formula I where $R^1$ and $R^2$ are each methyl.

0.1 mol of compound IV as in Example III is dissolved, with heating, in a mixture of ethanol, water and concentrated hydrochloric acid which mixture comprises 200 milliliters of ethanol, 40 milliliters of water and 30 milliliters of concentrated hydrochloric acid. The mixture is brought to a temperature of 70° to 75°C. for 2 hours, diluted by the addition of 5 volumes of water and rendered alkaline by the addition of ammonia. This is followed by extraction with ether, drying over sodium sulfate and removal of the solvent by evaporation at a reduced pressure, less than atmospheric, i.e. under vacuum. The title compound was secured. Its analysis was confirmed by analysis of the hydrochloride and maleate salts thereof. The hydrochloride salt melted at 210°C. and the maleate salt melted at 118°C. Analysis confirmed the empiric formula $C_{21}H_{20}ClN$ for the hydrochloride salt of compound I and the empiric formula $C_{25}H_{23}NO_4$ for the maleate salt of compound I. Both salts were soluble in isopropanol and could be crystallized from a solution thereof in this solvent.

EXAMPLE V 5-(4-Piperadino-2-butyne-1-ylidene)dibenzo [a,d]-5H-Cycloheptene (Compound I)

This compound is identified as AU–2172 and is compound I wherein

is piperidino.

There is added to 0.12 mol of piperidine aqueous acetic acid solution (50:50) in sufficient amount to adjust the pH to 5. There is then added 15 milliliters of formol (formaldehyde source) in 30 percent aqueous solution;
0.1 mol of compound II;
250 milliliters of cuprous chloride
150 milliliters of ethanol;
50 milliliters of dioxane.

The mixture is heated at reflux for 3 hours. It is then diluted by the addition of 5 volumes of water, followed by the addition of an excess of acetic acid. It is then extracted with ether and the aqueous phase is rendered alkaline by the addition of ammonia. This is followed by extraction with ether, drying over sodium sulfate, and removal of the solvent by evaporation at a reduced pressure, less than atmospheric, i.e. under vacuum.

This resulted in the title compound, whose oxalate salt melted at 188°C. Dissolved in 95 percent ethanol, elemental analysis confirmed the empiric formula $C_{28}H_{25}NOB4$.

EXAMPLE VI 5-(4-N-Methylpiperazino-2-butyne-1-ylidene)dibenzo[a,d]-5H-Cycloheptene (Compound I)

In this compound

of the general formula represents N-methyl piperazino.

There is dissolved, under warm conditions, 0.1 mol of compound IV in which

is derived from N-methylpiperazine in a mixture of ethanol, water and pure sulfuric acid. There were 200 milliliters of ethanol, 40 milliliters of water and 30 milliliters of sulfuric acid in this mixture. The entire mixture is brought up to a temperature of 70° to 75°C. for 3 hours. It is then diluted by the addition of 5 volumes of water and alkalinized by the addition of ammonia. Extraction with ether, drying over sodium sulfate and expulsion of the solvent by evaporation at a pressure less than atmospheric (under vacuum) yields the product identified in the title.

This new compound was characterized by its dimaleate salt, which is soluble in ethanol and has a melting point of 176°C. Analysis confirmed the empiric formula $C_{32}H_{32}N_2O_8$.

In Table I below there are set forth the melting points of a certain number of specific compounds IV in the form of their salts and as free bases, in each instance after recrystallization from the solvent indicated.

TABLE I

| $N\begin{smallmatrix}R^1\\R^2\end{smallmatrix}$ | | Crystallization solvent | m.p. °C |
|---|---|---|---|
| diethylamino | oxalate | isopropanol | 188 |
| diisopropylamino | maleate | isopropanol/ether | 144 |
| pyrrolidino | base | isopropyl oxide | 116 |
| piperidino | base | isopropanol | 91 |
| perhydroazepino | oxalate | isopropanol | 168 |
| N-methylpiperazine | base | cyclohexane/heptane | 127 |
| morpholino | base | isopropanol/heptane | 68 |
| methyl-β-hydroxy-ethylamino | base | ethyl acetate | 146 |

In Table 2 below there are set forth the melting points and the results of the analysis of a number of compounds I in the form of their salts or of their free bases after recrystallization from the solvent indicated.

There was assigned to certain compounds a reference number comprising the letters AU followed by a four-figured numeral. There references appear in column 2 of the Table.

TABLE II

| R¹ / R² | | Crystallization solvent | M.P. °C | Analysis* |
|---|---|---|---|---|
| diethylamino | maleate | isopropanol | 141–2 | mol. wt. for $C_{27}H_{27}NO_4$ calculated: 429.5 found: 433.5 |
| diisopropyl-amino | base** AU-2178 (oil) | | | mol. wt. for $C_{25}H_{26}N$ calculated: 341.5 found: 345.0 |
| methyl hydroxy ethyl amino | oxalate | ethanol | 171–2 | mol. wt. for $C_{24}H_{23}NO_5$ calculated: 405.5 found: 410.0 |
| pyrrolidino | oxalate AU-2171 | ethanol | 168–70 then 187 | mol. wt. $C_{25}H_{23}NO_4$ calculated: 401.4 found: 396.5 |
| perhydro-azepino | oxalate | ethanol | 162 | mol. wt. for $C_{27}H_{27}NO_4$ calculated: 429.5 found: 434.0 |
| morpholine | oxalate AU-2173 | 95% ethanol | 185 | mol. wt. for $C_{25}H_{23}NO_5$ calculated: 417.5 found: 421.0 |

\* Acidimetry in non-aqueous medium
\*\* Purification by chromatography over basic alumina, elution with ether As stated above, the compounds of formula I have interesting pharmacological properties, being active on the central nervous system and on the cariovascular system. These properties are demonstrated by the test results on animals reported below.

The activity on the central nervous system manifested itself above all in anti-depressive action. Thus, the compound AU-2176 in the form of its hydrochloride salt gives positive responses in mice and rats in the specific tests for anti-depressants.

Administration to mice and rats in dosages of 20 milligrams per kilogram of body weight intraperitoneally or orally opposes the ptosis brought about in these animals by the simultaneous administration to them of reserpine in dosages of 2 milligrams per kilogram of body weight intraperitoneally. In a dosage of 10 milligrams per kilogram, intraperitoneally administered, it also opposes the ptosis caused by the administration to them of tetrabenazine (dosage 40 milligrams per kilogram subcutaneously).

Furthermore, in the same way as the classic anti-depressants, AU-2176 administered orally at a dosage of 15 milligrams per kilogram of body weight prolongs the motor excitation caused in rats by amphetamine (administered at a dosage of 4 milligrams per kilogram intraperitoneally). Furthermore, AU-2176 (the hydrochloride salt) administered to rats and mice at dosages of 5 milligrams per kilogram of body weight intraperitoneally, exerts an antinociceptive action vis-a-vis a chemical stimulus: phenyl benzoquinone.

With respect to the cardiovascular system the compounds I exert anti-arrhythmic action as shown by the following tests:

1. The following chemical compounds: AU-2171, AU-2172, AU-2173, and AU-2176, administered in dosages varying between 25 milligrams and 50 milligrams of the compound per kilogram of body weight (calculated as base) prevent in mice in vivo the cardiac fibrillation resulting from chloroform syncope.

2. AU-2176 (the hydrochloride salt) at concentrations of $5 \times 10^{-4}$ to $10^{-3}$ gram exerts in vitro a guanidine-like action on the isolated auricle of the guinea pig or rabbit, which animals were electrically excited, and prolongation of the refractory period also is observed.

3. The products AU-2171, AU-2172 and AU-2176 administered by perfusion in guinea pigs brought about bradycardia without affecting the form of the electrocardiographic trace.

Furthermore, all of these compounds administered intravenously in rats at dosages in the neighborhood of 0.5 milligrams per kilogram of body weight brought about hypotension which was not reducible by atropine.

The novel compounds I, possessing therapeutic action, are of low toxicity, and the ratio of activity to toxicity presents a satisfactory margin. Thus, by way of example, the $DL_{50}$ of AU-2173 in mice is 222 milligrams per kilogram of body weight when administered intraperitoneally, and 2,600 milligrams per kilogram of body weight when administered orally. That of AU-2176 is 158.3 milligrams per kilogram of body weight when intraperitoneally administered, and 956 milligrams peer kilogram of body weight when administered orally.

Furthermore, the oral administration of AU-2176 in the form of its hydrochloride salt in a daily dosage of 60 milligrams per kilogram of body weight for 30 days in young rats does not prevent normal growth and does not modify the hematological constants.

Thus, as a result of their activity on the central nervous system, our new compounds, those of formula I, are indicated as useful in the treatment of psychic ailments and more particularly in depressive syndromes of varied etiology, while the effects on the cardiocascular system justify their use in the treatment of cardiac arrythemias, normotopic or heterotopic.

The new therapeutic agents may be administered orally or parenterally, the active agent being either in non-toxic salt form or in base form.

The compound of formula I may be prepared in the usual way for administration with the usual vehicles and excipients suitable for these modes of administration. Thus, suitable pharmaceutical formulations include tablets, dragees, gelatin capsules, solutions in ampoules and injectable solutions which may be in ampoules. In these formulations the amount of active agent administered as a unit dose may vary from 5 to 50 milligrams, and there may be administered to the patient one or several such doses daily. The average daily dose will ordinarily vary from 0.1 milligram to 5 milligrams per kilogram of body weight of the patient.

There are given here below, by way of illustration, some examples of these formulations, as well as of the manner in which they may be prepared.

A. Tablets of 25 milligrams dosage
| | |
|---|---|
| AU-2176 (hydrochloride salt) | 2,500 gms. |
| Lactose | 7,000 gms. |
| Corn starch | 5,000 gms. |
| Potato starch | 400 gms. |
| Magnesium stearate | 100 gms. |
| | 15,000 gms. |

This formula may be converted into 100,000 tablets.

The hydrochloride salt of AU-2176, lactose and corn starch are incorporated in the potato starch in the form of a 10 percent paste. The wet mass is granulated on a screen and dried at 45°C. The tablets are then prepared from the granulated mass.

B. Gelatin capsules of 50 milligrams dosage
| | |
|---|---|
| AU-2176 in the form of its hydrochloride salt | 5,000 gms. |
| Lactose | 14,800 gms. |
| Magnesium stearate | 200 gms. |
| | 20,000 gms. |

This preparation will yield 100,000 gelatin capsules each containing 200 milligrams of powder.

The mixture is thoroughly mixed and placed in capsules of appropriate size.

C. Injectable solution in ampoules in dosages of 10 milligrams each
| | |
|---|---|
| AU-2176 in the form of its hydrochloride salt | 50 gms. |
| Water suitable for the preparation of injectable solutions | q.s.p. 50,000 mls. |

From this solution 10,000 ampoules each of 5 milliliters content may be prepared.

The AU-2176, in the form of its hydrochloride salt, is dissolved in warm water, filtered and placed in ampoules of 5 milliliters content. They are then sterilized as by aseptic filtration or by autoclaving.

We claim:

1. A compound selected from the group which consists of compounds of the formula

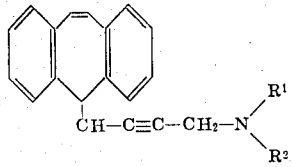

wherein $R^1$ and $R^2$ are each selected from alkyl and hydroxyalkyl, or wherein

forms part of a heterocycle selected from the class consisting of pyrrolidine, piperidine, morpholine, perhydroazepine and N-alkyl-piperazine; and acid addition salts thereof with pharmacologically acceptable acids.

2. A compound as defined in claim 1 in which the alkyl as well as the alkyl moiety of hydroxyalkyl, as represented by $R^1$ and $R^2$, are lower alkyl.

3. A compound as defined in claim 1 wherein the hydroxyalkyl is a ω-hydroxyalkyl.

4. A compound as defined in claim 1 wherein said N-alkyl-piperazine is N-lower alkyl piperazine.

5. 5-(4-Dimethylamino-2-butyne-1-ylidene) dibenzo[a,d]-5H-cycloheptene, as claimed in claim 1.

6. 5-(4-Piperidino-2-butyne-1ylidene)dibenzo[a,d]-5H-cycloheptene, as claimed in claim 1.

7. 5-(4-N-Methylpiperazineo-2-butyne-1-ylidene)dibenzo[a,d]-5H-cycloheptene, as claimed in claim 1.

8. 5-(4-Diethylamino-2-butyne-1-ylidene)dibenzo[a,d]-5H-cycloheptene, as claimed in claim 1.

9. 5-(4-Diisopropylamino-2-butyne-1-ylidene)dibenzo[a,d]-5H-cycloheptene, as claimed in claim 1.

10. 5-(4-Pyrrolidino-2-butyne-1-ylidene)dibenzo[a,d]-5H-cycloheptene, as claimed in claim 1.

11. 5-(4-Perhydroazepino-2-butyne-1-ylidene)dibenzo[a,d]-5-H-cycloheptene, as claimed in claim 1.

12. 5-(4-Morpholino-2-butyne-1-ylidene)dibenzo[a,d]-5H-cycloheptene, as claimed in claim 1.

13. 5-(4-Methyl-β-hydroxyethylamino-2-butyne-1-ylidene)dibenzo[a,d]-5H-cycloheptene, as claimed in claim 1.

14. An acid addition salt of 5-(4-dimethylamino-2-butyne-1-ylidene)dibenzo[a,d]-5H-cycloheptene selected from the oxalate, maleate and hydrochloride acid addition salts, as claimed in claim 1.

15. An acid addition salt of 5-(4-piperidino-2-butyne-1-ylidene)dibenzo[a,d]-5H-cycloheptene selected from the oxalate, maleate and hydrochloride acid addition salts, as claimed in claim 1.

16. An acid addition salt of 5-(4-N-methyl-piperazino-2-butyne-1-ylidene)dibenzo[a,d]-5H-cycloheptene selected from the oxalate, maleate and hydrochloride acid addition salts, as claimed in claim 1.

17. An acid addition salt of 5-(4-diethylamino-2-butyne-1-ylidene)dibenzo[a,d]-5H-cycloheptene selected from the oxalate, maleate and hydrochloride acid addition salts, as claimed in claim 1.

18. An acid addition salt of 5-(4-diisopropylamino-2-butyne-1-ylidene)dibenzo[a,d]-5H-cycloheptene selected from the oxalate, malate and hydrochloride acid addition salts, as claimed in claim 1.

19. An acid addition salt of 5-(4-pyrrolidino-2-butyne-1-ylidene)dibenzo[a,d]-5H-cycloheptene selected from the oxalate, maleate and hydrochloride acid addition salts, as claimed in claim 1.

20. An acid addition salt of 5-(4-perhydroazepino-2-butyne-1-ylidene)dibenzo[a,d]-5H-cycloheptene selected from the oxalate, maleate and hydrochloride acid addition salts, as claimed in claim 1.

21. An acid addition salt of 5-(4-morpholino-2-butyne-1-ylidene)dibenzo[a,d]-5H-cycloheptene selected from the oxalate, maleate and hydrochloride acid addition salts, as claimed in claim 1.

22. An acid addition salt of 5-(4-methyl-β-hydroxyethylamino-2-butyne-1-ylidene)dibenzo[a,d]-5H-cycloheptene selected from the oxalate, maleate and hydrochloride acid addition salts, as claimed in claim 1.

23. The process of preparing a compound of the formula

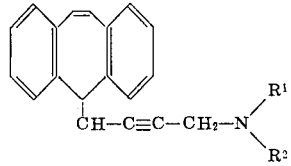

wherein $R^1$ and $R^2$ are each selected from the group which consists of alkyl and hydroxyalkyl or wherein

forms part of a heterocycle selected from the class consisting of pyrrolidine, piperidine, morpholine, perhydroazepine and N-alkyl-piperazine, which comprises reacting at an elevated temperature in an inert organic solvent 5-oxo-dibenzo[a,d]cycloheptene with an approximately equivalent amount of a propargyl metal halide of the formula (HC ≡ C — $CH_2$X)n/2 M wherein X is halogen, M is a metal and n is equal to the valence of M to obtain 5-(2-propyne-1-ylidene)dibenzo[a,d]-5H-cycloheptene, separating the last named compound from the reaction mixture, and reacting at an elevated temperature the separated last named compound in accordance with Mannich reaction conditions with a source of formaldehyde and an amine of the formula

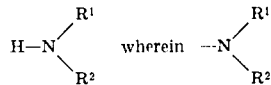

is as above identified; the Mannich reaction conditions including an inert organic solvent and a catalytic amount of a copper compound.

24. The process as defined in claim 23 in which said propargyl metal halide is a propargyl metal bromide.

25. The process as defined in claim 23 wherein said Mannich reaction is carried out at boiling point in a mixture of ethanol and a cyclic ether oxide solvent.

26. The process as defined in claim 25 wherein the cyclic ether oxide is selected from the group which consists of dioxane and tetrahydrofuran.

27. The process of preparing a compound of the formula

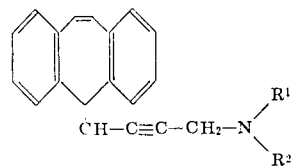

wherein R and R are each selected from the group which consists of alkyl and hydroxyalkyl or wherein

forms part of a heterocycle selected from the class consisting of pyrrolidine, piperidine, morpholine, perhydroazepine and N-alkylpiperazine, which comprises reacting at an elevated temperature in an inert organic solvent 5-oxo-dibenzo[a,d]cycloheptene with approximately two equivalent amounts of a propargyl metal halide of the formula (HC ≡ C — $CH_2$X)n/2 M wherein X is halogen, M is a metal and n is equal to the valence of M to obtain 5-(2-propyne-5-hydroxy)dibenzo[a,d]-5H-cycloheptene, separating the last named compound from the reaction mixture, and reacting at an elevated temperature the separated last named compound in accordance with Mannich reaction conditions with a source of formaldehyde and an amine of the formula

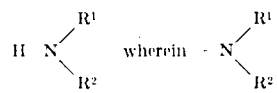

is as above identified, the Mannich reaction conditions including an inert organic solvent and a catalytic amount of a copper compound, to obtain a 5-hydroxy derivative, and dehydrating the 5-hydroxy derivative at an elevated temperature in the presence of a strong mineral acid.

28. The process as defined in claim 27 wherein said propargyl metal halide is selected from the group which consists of magnesium propargyl bromide and aluminum propargyl metal bromide.

29. The process as defined in claim 27 wherein said acid is sulfuric acid.

* * * * *

UNITED STATES PATENT OFFICE
CERTIFICATE OF CORRECTION

Patent No. 3,723,420          Dated March 27, 1973

Inventor(s) Frajda Dvolaitzky et al.

It is certified that error appears in the above-identified patent and that said Letters Patent are hereby corrected as shown below:

In the abstract,

In claim 1, column 9, lines 48-56,

In claim 23, column 11, lines 6-10, and

In claim 27, column 12, lines 3-9, correct the formula to read

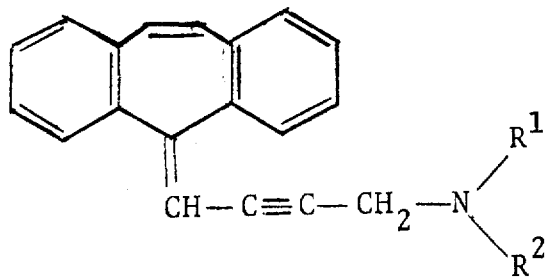

This certificate supersedes Certificate of Correction issued October 30, 1973.

Signed and sealed this 12th day of March 1974.

(SEAL)
Attest:

EDWARD M. FLETCHER, JR.
Attesting Officer

C. MARSHALL DANN
Commissioner of Patents